United States Patent
Wagner et al.

(10) Patent No.: US 9,284,925 B2
(45) Date of Patent: Mar. 15, 2016

(54) FLAT FILTER ELEMENT OF A FILTER, FILTER AND SUPPORT DEVICE OF A FILTER

(71) Applicant: MANN+HUMMEL GMBH, Ludwigsburg (DE)

(72) Inventors: Fabian Wagner, Moeglingen (DE); Robert Hasenfratz, Waiblingen (DE); André Roesgen, Remshalden (DE); Christian Thalmann, Speyer (DE); Frank Pflueger, Sachsenheim (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 0 days.

(21) Appl. No.: 14/044,350

(22) Filed: Oct. 2, 2013

(65) Prior Publication Data

US 2014/0090344 A1     Apr. 3, 2014

(30) Foreign Application Priority Data

Oct. 2, 2012   (DE) .......................... 10 2012 019 320

(51) Int. Cl.
| | | |
|---|---|---|
| *B01D 46/00* | (2006.01) | |
| *F02M 35/024* | (2006.01) | |
| *B01D 46/52* | (2006.01) | |
| *B01D 46/10* | (2006.01) | |

(52) U.S. Cl.
CPC ....... *F02M 35/02491* (2013.01); *B01D 46/521* (2013.01); *B01D 46/0005* (2013.01); *B01D 46/10* (2013.01)

(58) Field of Classification Search
CPC ................ B01D 46/10; B01D 46/521; B01D 227/1027; B01D 46/08; B01D 46/13; B01D 2279/51; B01D 2273/30

USPC ........ 55/502, 493, 385.2, 472–473, 483–484; 210/438, 450, 493.2
See application file for complete search history.

(56) References Cited

U.S. PATENT DOCUMENTS

| | | | |
|---|---|---|---|
| 5,125,941 A | | 6/1992 | Ernst |
| 5,833,727 A | * | 11/1998 | Skarsten ...................... 55/385.2 |
| 2002/0036165 A1 | * | 3/2002 | Sommer et al. ............... 210/438 |
| 2011/0167776 A1 | * | 7/2011 | Gorg et al. ...................... 55/493 |

FOREIGN PATENT DOCUMENTS

| | | |
|---|---|---|
| DE | 29904204 U1 | 5/1999 |
| EP | 0478895 A1 | 4/1992 |

* cited by examiner

*Primary Examiner* — Robert Clemente
*Assistant Examiner* — Karla Hawkins
(74) *Attorney, Agent, or Firm* — James Hasselbeck

(57) ABSTRACT

A flat filter element (34), a filter (10), and a support/positioning body (72, 74, 76) are disclosed. The flat filter element (34) includes a filter medium (64) with an inflow-side raw side (62) and an outflow-side clean side (58). An element sealing section (77) surrounds, circumferentially closed, the filter medium (64) on the raw side (62), the clean side (58), or between the raw side (62) and the clean side (58). The element sealing section (77) serves for supporting a sealing device (78) for sealing the raw side (62) relative to the clean side (58) upon arrangement of the flat filter element (34) in a filter housing (12) of the filter (10). At least one support/positioning body (72, 74, 76) can be supported, for positioning and holding at least the sealing device (76) in the filter housing (12), on the one hand at least on the sealing device (78) and on the other hand on the filter housing (12).

8 Claims, 4 Drawing Sheets

FLAT FILTER ELEMENT OF A FILTER, FILTER AND SUPPORT DEVICE OF A FILTER

CROSS REFERENCE TO RELATED APPLICATIONS

This application claims the benefit under 35 USC 119 of German patent application No. 10 2012 019 320.3 filed Oct. 2, 2012, and which is hereby incorporated by reference in its entirety.

TECHNICAL FIELD

The invention concerns a flat filter element of a filter for fluids, in particular air, fuel, oil, or water, in particular of an internal combustion engine, in particular of a motor vehicle, comprising a filter medium with an inflow-side raw side and an outflow-side clean side and with an element sealing section that surrounds, circumferentially closed, the filter medium on the raw side, the clean side, or between the raw side and the clean side for supporting a sealing device for sealing the raw side relative to the clean side upon arrangement of the flat filter element in a filter housing of the filter.

Moreover, the invention concerns a filter for fluids, in particular air, fuel, oil, or water, in particular of an internal combustion engine, in particular of a motor vehicle, comprising a flat filter element with a filter medium with an inflow-side raw side and an outflow-side clean side and with an element sealing section that surrounds, circumferentially closed, the filter element at the raw side, the clean side, or between the raw side and the clean side for supporting a sealing device for sealing the raw side relative to the clean side upon arrangement of the flat filter element in a filter housing of the filter.

Moreover, the invention concerns a support device of the filter for fluids, in particular air, fuel, oil, or water, in particular of an internal combustion engine, in particular of a motor vehicle.

BACKGROUND OF THE INVENTION

An air filter of an internal combustion engine of a motor vehicle known in the market has a filter housing in which a flat filter element is arranged. The filter housing comprises a filter cup and a filter cover that can be separated from the filter cup. The flat filter element comprises a filter medium which is folded in a zigzag shape to a filter bellows. The filter bellows has approximately the shape of a parallelepiped. In flat filter elements, the filter media are not closed, i.e., end face folds, like end face edges, are not connected to each other. In contrast thereto, in round filter elements the filter media are closed, i.e., their end face folds are connected to each other. The end face folds are the two outermost folds on opposite end faces of the filter bellows. End face rims are the two free rims of the filter medium which extend along the end face folds and delimit them at the end faces of the filter bellows. The end face edges of the filter bellows are the two other free rims of the filter bellows which extend between the end face rims and extend in accordance with the folding of the filter bellows. The fold edges are those edges along which the filter medium is folded. In the zigzag-shaped folded parallelepipedal filter bellows, the end face rims and the fold edges are straight and extend parallel to each other. The end face edges extend in a zigzag shape and perpendicular to the end face rims and the fold edges. On a sealing rim of the filter bellows that surrounds the inflow side, a seal of polyurethane (PUR) is arranged. The seal surrounds, circumferentially closed, the inflow side relative to an imaginary central axis of the sealing rim. The seal projects past the filter bellows relative to the central axis in radial direction outwardly. The flat filter element is axially inserted relative to the central axis into the filter cup. The filter cup has a sealing surface which relative to the central axis extends in radial direction outwardly and on which a side of the seal of the flat filter element in axial direction is resting seal-tightly. The filter cover has also a sealing surface which relative to the central axis extends in radial direction outwardly. When the filter cover is mounted, its sealing surface in axial direction is resting seal-tightly on the side of the seal that is positioned opposite the sealing surface of the filter cup. The seal of the flat filter element is then tightly clamped between the sealing surfaces of the filter cover and the sealing surface of the filter cup. In this way, the seal seals the inflow-side raw side of the flat filter element from the outflow-side clean side. Thus, on the filter head and on the filter cover a sealing surface is required, respectively. The two sealing surfaces must be arranged such that they can interact with each other for compressing the seal.

The object of the invention is to configure a flat filter element, a filter, and a support device of the aforementioned kind with which the expenditure for realizing a sealing action of the raw side relative to the clean side can be reduced. In particular, the expenditure with regard to required sealing surfaces is to be reduced. Moreover, penetration of leak air is to be prevented.

SUMMARY OF THE INVENTION

An This object is solved according to the invention by at least one support/positioning body which, for positioning and securing at least the sealing device within the filter housing, can rest, on the one hand, at least on the sealing device and, on the other hand, on the filter housing.

According to the invention, at least one support/positioning body is thus provided which is arranged on the flat filter element and with which the sealing device is positioned and secured in the filter housing. The at least one support/positioning body can be arranged fixedly or detachably on the flat filter element, in particular the filter medium. In this connection, the at least one support/positioning body takes on the support function of one of the housing-associated sealing surface of the prior art filter. In this way, this housing-associated sealing surface can be eliminated. With the at least one support/positioning body the sealing device can be secured in an optimal position in the filter housing. Advantageously, with the at least one support/positioning body the entire flat filter element can be additionally secured in an optimal position in the filter housing. The at least one support/positioning body can serve as a counter bearing in order to be able to press the sealing device against an appropriate housing sealing surface of the filter housing. The at least one support/positioning device with its side that is facing away from the element sealing section can be supported, in turn, on the housing. The element sealing section can advantageously be a rim that surrounds the raw side or the clean side of the filter medium, in particular of a filter bellows. Alternatively, the element sealing section can be located between the raw side and the clean side of the filter medium. An appropriate support location of the housing is located can be separate in this context from the housing sealing device, in particular, can be remote from it. Advantageously, the sealing device can have at least one seal which can be supported on the element sealing section and a corresponding housing sealing surface of the filter housing. The sealing device can also have a combination of several seals of which one can be supported on the element sealing section and can be supported on the housing sealing surface. Advantageously, the at least one seal can be made of PUR. PUR seals are elastic and can be compressed easily. In this way, the sealing action can be increased. Moreover, seals of PUR can be easily realized. In particular, a PUR seal can be integrally attached by injection molding or foaming to the element sealing section of the filter medium. The at least one seal can advantageously have a sealing lip. Advantageously, the sealing device can have at least one seal that is acting axially relative to the central seal axis, a so-called axial seal. The axial seal can be supported with one side seal-tightly on the housing sealing surface of the filter housing. In addition or alternatively, the sealing device can have a seal that is acting radially relative to the central axis, a radial seal. The radial seal can seal accordingly in radial direction against an appropriate housing sealing surface of the filter housing. The at least one seal can also be designed as a seal that acts radially and axially. The central seal axis is an imaginary axis which is extending through the inflow side and the outflow side of the filter medium when the sealing device is mounted. When the seal has a rectangular profile and extends in a plane, the central seal axis corresponds to an imaginary axis through the center point of this rectangular profile. When the element sealing section has a rectangular profile and extends in a plane, the central element axis corresponds to an imaginary axis through the center point of this rectangular profile. The central element axis intersects the inflow side and the outflow side of the filter medium. The central seal axis and/or the central element axis may coincide with a central axis of the filter or can realize it. The central axis of the filter can also be a mounting axis along which the flat filter element is inserted into the filter housing. The sealing device can be connected fixedly with the element sealing section of the flat filter element. Also, a sealing device can be provided that is detachably arranged on the element sealing section. The element sealing section for this purpose can have an appropriate element sealing surface on which the sealing device is resting seal-tightly. In addition or alternatively, the sealing device can be fixedly or detachably connected with the at least one support/positioning body. Advantageously, the at least one support/positioning body can have at least one elongate support leg which can be arranged in a space-saving way in the filter housing. Advantageously, the at least one support/positioning body can directly or indirectly support the sealing device. The at least one support/positioning body can thus transmit a support force from an appropriate stop of the filter housing directly onto the sealing device. Advantageously, several support/positioning bodies can be arranged so as to be circumferentially distributed; they transmit their support forces, respectively, onto the sealing device and/or the element sealing section.

In an advantageous embodiment, the at least one support/positioning body can extend at least axially to a central axis of the filter. The at least one support/positioning body can advantageously be supported on an appropriate stop on a side of the housing opposite the sealing device. The at least one support/positioning body can thus press the sealing device against the housing sealing surface of the filter housing. In this way, a force transmission onto the sealing device can be improved. Moreover, in this way a compression of the sealing device between the at least one support/positioning body and the housing sealing surface can be improved. Also, in this way by means of the at least one support/positioning body the sealing device can be positioned and secured precisely and safely in the filter housing. The at least one stop for the at least one support/positioning body in the filter housing can be arranged on a bottom of the filter housing, in particular of a filter cup. Alternatively, or in addition, appropriate stops, in particular in the form of projections, can be arranged also on the sidewalls of the filter housing onto which the at least one support/positioning body can be placed.

In a further advantageous embodiment, the at least one support/positioning body can project past the filter medium at least on one side, when viewed axially relative to the center axis of the filter. In this way, an appropriate stop for the at least one support/positioning body in the filter housing can be spaced relative to the filter medium. In this way, advantageously the at least one support/positioning body can be supported on a housing wall that is positioned opposite the filter medium and which delimits with the appropriate side, i.e., the inflow side or outflow side, of the filter medium an outlet space or inlet space for the fluid.

Advantageously, at least two support/positioning bodies can be provided that, viewed axially to a central axis of the filter, have different lengths. In this way, the at least two support/positioning bodies can be supported on appropriate stops of the filter housing which can be positioned at different spacings relative to the filter medium. In this way, also different axial lengths of the filter housing relative to the central axis can be compensated. Advantageously, the at least two support/positioning bodies can thus be supported on a stepped wall, in particular a stepped bottom, of the filter housing.

In a further advantageous embodiment, a circumferentially extending support frame on which the at least one support body can be supported can be provided at least for the sealing device. Advantageously, the support frame can be integrated into the sealing device, in particular embedded in at least one seal. Preferably, the support frame can be made of plastic material. It can also be of a different type of material. The support frame can advantageously be embedded in sealing material by casting, injection molding, or foaming. Preferably, the at least one support/positioning body and the support frame can be fixedly connected to each other, preferably as a single piece. With the support frame, the sealing device can be stabilized circumferentially. Pressing forces of the at least one support/positioning body can be distributed with the support frame circumferentially uniformly onto the sealing device. Accordingly, the uniform circumferential sealing action can be improved. Advantageously, the support frame can support and/or stabilize additionally the filter medium.

In a further advantageous embodiment, the flat filter element can be exchangeably arranged in the filter housing that is of at least a two-part configuration. In this way, the flat filter element, as needed, in particular for servicing purposes or for cleaning, can be removed easily from the filter housing. A filter housing of at least two parts can be easily opened in that the housing parts are at least partially separated from each other. Advantageously, upon separation of the at least two housing parts, a mounting opening can be opened into which the flat filter element along the mounting axis, preferably axial to the central element axis, can be inserted. Advantageously, the filter element can be arranged such within the filter housing of at least two parts that the at least one support/positioning body with a side facing away from the element sealing section is supported on one of the housing parts and the housing sealing surface of the filter housing is arranged on another one of the at least two housing parts. Advantageously, the filter housing can have a housing cup and a housing cover. A housing sealing surface can advantageously project past an inflow-side or outflow-side filter surface of the filter medium radially relative to the central element axis. In this way, the outer dimensions of the filter housing, in particular in areas in which the filter surface, as a result of the seals or adhesive connections arranged thereat, cannot be flowed through anyway, can be tapered. In this way, the mounting space required for the filter can be reduced.

The technical object is solved moreover for the filter by at least one support/positioning body that, for positioning and securing at least the sealing device in the filter housing, can be supported on the one hand at least on the sealing device and on the other hand on the filter housing. The features and advantages that have been explained above in connection with the filter element according to the invention apply likewise to the filter according to the invention and its advantageous embodiments.

The technical object is moreover solved by the support device that can be arranged for positioning and securing a sealing device in a filter housing on a flat filter element of the filter. The features and advantages that have been explained above in connection with the flat filter element according to the invention and the filter according to the invention apply likewise to the support/positioning body according to the invention and its advantageous embodiments.

BRIEF DESCRIPTION OF THE DRAWINGS

Further advantages, features, and details of the invention result from the following description in which embodiments of the invention will be explained in more detail with the aid of the drawing. A person of skill in the art will consider the features disclosed in combination in the drawing, the description, and the claims also expediently individually and combine them to meaningful further combinations. It is shown schematically in:

In the Figures same components are identified with same reference characters.

DETAILED DESCRIPTION

Figure 1:
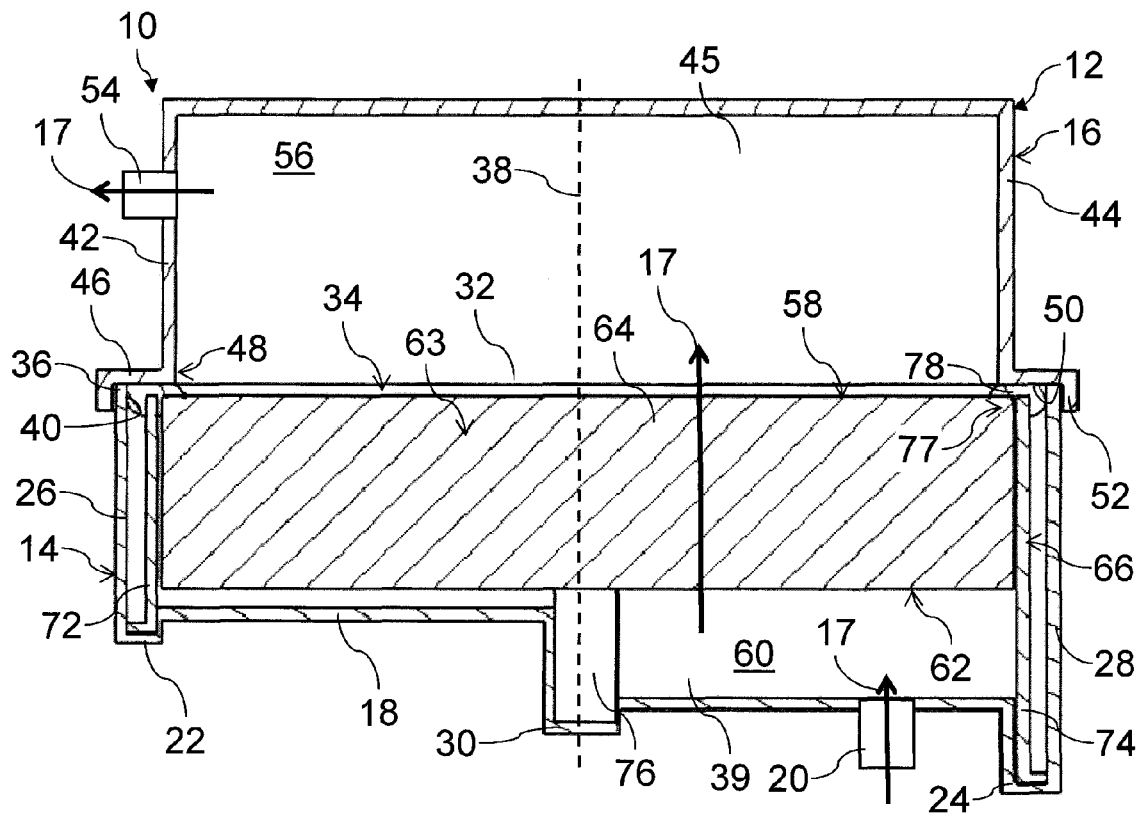
FIG. 1 a longitudinal section of an air filter of an internal combustion engine with a flat filter element according to a first embodiment that is arranged exchangeably/replaceably in an air filter housing.

In FIG. 1 an air filter 10 of an internal combustion engine of a motor vehicle is shown in longitudinal section. The air filter 10 can be arranged in an intake manifold of the internal combustion engine. With the air filter 10 intake air of the internal combustion can be purified.

The air filter 10 comprises an air filter housing 12 that is rectangular in profile. The air filter housing 12 is combined of the housing cup 14, in FIG. 1 at the bottom, and a housing cover 16, at the top. The housing cup 14 as well as the housing cover 16 each have an approximately rectangular cross-section. Flows of the air to be purified into the air filter housing 12 and within the air filter housing 12 and of the purified air from the air filter housing 12 are indicated by arrows 17 in FIG. 1.

A bottom 18 of the housing cup 14 is stepped multiple times. The bottom 18 in the normal mounting position of the air filter 10, as illustrated in FIG. 1, is spatially at the bottom. In a lower section of the bottom 18, an inlet 20 for the air to be purified is arranged. The inlet 20 is connected outside of the air filter housing 12 to a line section of the intake manifold of the internal combustion engine.

On a respective transition of two adjoining oppositely positioned sidewalls 26 of the housing cup 14 and 28, the bottom 18 has a recess 22 and 24, respectively. The recesses 22 and 24 each extend along the respective sidewalls 26 and 28. Between the recesses 22 and 24, the bottom 18 has a central recess 30 which is adjacent to a step of the bottom 18 and extends parallel to the recesses 22 and 24. The recesses 22, 24, and 30 each are approximately U-shaped in profile. The width of the central recess 30 is greater than the respective width of the two lateral recesses 22 and 24. The axial spacing between the upper lateral recess 22 and a rim 36 of the housing cup 14 is smaller than the axial spacing between the lower lateral recess 24 and the rim 36. When "axial", "radial", "coaxial" or "circumferential" is mentioned, this refers to the imaginary filter axis 38, if nothing else is indicated. The axial spacing between the central recess 30 and the rim 36 is, with respect to its magnitude, between the respective axial spacing of the lateral recess 22 and the rim 36 and the lateral recess 24 and the rim 36.

On the side that is facing the housing cover 16, the housing cup 14 has a mounting opening 32 for a flat filter element 34 that is arranged exchangeably/replaceably in the filter housing 12. The rim 36 of the housing cup 14 which surrounds the mounting opening 32 is flat on the side which is facing the housing cover 16 and is circumferentially closed. In the area of the rim 36, the radial inner circumferential surfaces of the sidewalls 26 and 28 and of the two other sidewalls 39 of the housing cup 14 are designed as a radial sealing surface 40. In FIG. 1, as a result of the longitudinal section, only the rearwardly positioned one of the two other sidewalls 39 is visible.

The housing cover 16 is open at the side which is facing the housing cup 14. On its rim which is facing the housing cup 14 the sidewalls 42 and 44 and the two other sidewalls 45 of the housing cover 16 connecting the sidewalls 42 and 44 are each bent by 90° in radial outward direction to a sealing section 46 of a housing sealing device 48. The sidewalls 42 and 44 each extend parallel to the sidewalls 26 and 28 of the housing cup 14. The sidewalls 45 each extend parallel to the sidewalls 39 of the housing cup 14. The sealing section 46 has a radially outwardly extending housing sealing surface 50 which is circumferentially closed. Radially outwardly, the housing sealing surface 50 is surrounded by a receiving section 52 which extends axially away from a closed side of the housing cup 14 and is circumferentially closed. A spacing between the radial outer circumferential sides of the sidewalls 26 and 28 of the housing cup 14 is smaller than a spacing between the radial inner circumferential sides of the receiving section 52 at the oppositely positioned sidewalls 42 and 44 of the housing cover 16. A spacing between the radial outer circumferential sides of the sidewalls 39 of the housing cup 14 is smaller than a spacing between the radial inner circumferential sides of the receiving section 52 on the respective oppositely positioned sidewalls 45 of the housing cover 16. In the assembled air filter housing 12, as shown in FIG. 1, the radial inner circumferential side of the receptacle 52 is resting on the radial outer circumferential side of the housing cup 14. The housing sealing surface 50 is located on the side of the sealing section 46 that is facing the housing cup 14.

In the side wall 42 of the housing cover 16, an outlet 54 for purified air is also arranged which is connected outside of the air filter housing 12 with a line section of the intake manifold of the internal combustion engine.

An interior of the housing cover 16 forms an outlet space 56 for the air to be cleaned. The outlets space 56 adjoins a clean side 58 of the flat filter element 34. The interior of the housing cup 14 forms an inlet space 60 for the purified air. The inlet space 60 adjoins a raw side 62 of the flat filter element 34. The flat filter element 34 is arranged in the inlet space 60 such that it separates the outlet 54 from the inlet 20.

The flat filter element 34 has a filter bellows 63 of a zigzag-shaped filter medium 64. The filter medium 64 is a nonwoven filter material. The filter medium 64 as a whole is of a parallelepipedal shape. The filter medium 64 of the flat filter element 34 is not closed, i.e., neither end face folds nor the end face edges are connected to each other. The end face folds are the two outer folds on opposite end faces of the filter bellows 63. The end face rims are the two free rims of the filter medium 64 which extend along the end face folds and delimit them at the end faces of the filter bellows 63. The end face edges of the filter bellows 63 are the two other free rims of the filter bellows 63 which extends between the end face rims and extend in accordance with the folding of the filter bellows 63. The fold edges are the edges along which the filter medium 64 is folded. In the zigzag-shaped folded parallelepipedal filter bellows 63 the end face rims and the fold edges are straight and extend parallel to each other. The end face edges extend in a zigzag shape and perpendicular to the end face rims and the fold edges. The end face edges of the filter medium 64 are sealed tightly by glue beads. Fold edges of the filter medium 64 at the outflow side are located at the clean side 58, in FIG. 1 at the top. Inflow-side fold edges of the filter medium 64 are located at the raw side 62, in FIG. 1 at the bottom, in the inlet space 60.

On the flat filter element 34 a support device 66 is arranged. The support device 66 comprises four corner support legs 72 and 74 and two central support legs 76. The corner support legs 72 and 74 each are arranged radially outwardly on the lateral edges of the filter bellows 63 that extend axially to the filter axis 38. The corner support legs 72 and 74 each have an approximately L-shaped profile. They engage the edges of the filter bellows 63 which extend in axial direction. The radial inner circumferential sides of the corner support legs 72 and 74 are resting on the radial outer circumferential side of the filter bellows 63. From the top side of the filter bellows 63 that is facing the housing cover 16, the corner support legs 72 and 74 extend in axial direction relative to the filter axis 38 away from the filter medium 64 to the bottom 18 of the housing cup 18. On their free ends facing away from the filter medium 64 the corner support legs 72 and 74 are each bent by approximately 90° in radial outward direction. In this way, the support surface of the corner support legs 72 and 74 is enlarged at their free ends. The corner support legs 72, axially viewed, are shorter than the corner support legs 74. When the flat filter element 34 is mounted, the free ends of the short corner support legs 72 are supported in the upper lateral recesses 22. The free ends of the long corner support legs 74 are supported in the lower lateral recess 34.

On the sides of the flat filter element 34 which are facing the rear lateral wall 49 and the front lateral wall, respectively, one of the central support legs 76 is arranged, respectively. The central support legs 76 are each planar and elongate in axial direction. The radial inner circumferential sides of the central support legs 76 each are resting on the radial outer circumferential side of the filter bellows 63. They extend in axial direction to the bottom 18 of the housing cup 14. On their free ends which are facing away from the filter medium 64, the central support legs 76 are each bent by approximately 90° in radial direction outwardly. In this way, the support surface of the central support legs 76 is enlarged at their free ends. The axial length of the central support legs 76 is greater than that of the short corner support legs 72 and shorter than that of the long corner support legs 74. The central support legs 76 are flush with the top side of the filter bellows 63 facing the housing cover 16. The central support legs 76 each are supported with their free ends in the central recesses 30 in the bottom 18.

At the clean side 58, the sealing section 46 of the housing cover 16 with the housing sealing surface 50 projects past the filter bellows 63 in radial inward direction. An axial extension of the corner support legs 72 and 74 and of the central support legs 76 is located within the housing sealing surface 50, respectively.

On the top side of the filter bellows 63 a seal 68 of polyurethane (PUR) is arranged. The seal 68 surrounds, circumferentially closed, the filter bellows 63 on the clean side 58. The seal 78 projects past the filter bellows 63 in axial direction and in radial direction. The ends of the corner support legs 72 and 74 and of the central support legs 76 provided thereat are embedded in the seal 68. The areas of the filter bellows 63 on which the seal 78 is resting form an element sealing section 77.

In the first embodiment and the further embodiments to be explained in the following, a central element axis of the flat filter element 34, a central axis of the element sealing section 77, and a central seal axis of the seal 68 coincide with the filter axis 38 when the flat filter element 34 is mounted so that, for reasons of simplification, in the Figures only one axis 38 in dashed line is indicated for showing the central element axis, the filter axis, the central axis of the element sealing axis section 77, and the central seal axis of the seal 68.

Figure 2:
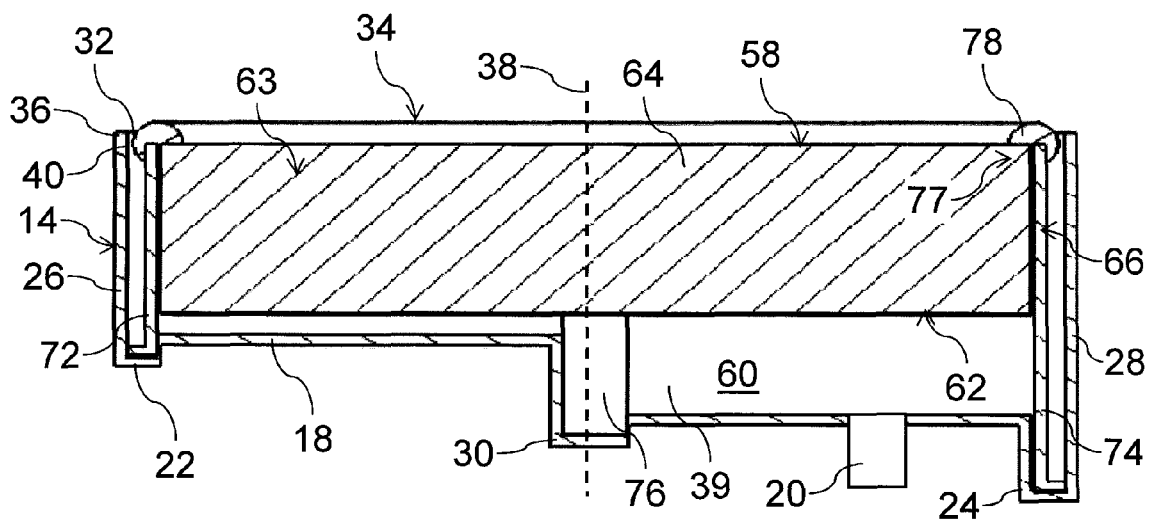
FIG. 2 the air filter of FIG. 1 wherein the open air filter housing is shown without the filter housing cover.

For mounting the air filter 10, the flat filter element 34 is inserted, with the free ends of the corner support legs 72 and 74 and of the central support legs 76 leading, in axial direction relative to the filter axis 34 into the housing cup 14. In the present embodiments, a mounting axis along which the flat filter element 34 is installed into the filter housing 12 coincides also with the filter axis 34. Upon installation, the flat filter element 34 is oriented such that the long corner support legs 74 are located on the side of the lower recess 24 and the short corner support legs 72 are located on the side of the upper recesses 22 of the housing cup 14. The bases of the recesses 22, 24, and 30 act as stops for the corner support legs 72 and 74 and the central support legs 76, respectively. The seal 78 projects in this assembly phase, as indicated in FIG. 2, past the rim 36 of the housing cup 14 in axial direction. In this assembly phase, the radial outer circumferential side of the seal 78 is still positioned at a spacing relative to the radial sealing surface 40 of the housing cup 14. The filter bellows 63 and the seal 78 are positioned and secured by means of the corner support legs 72 and 74 and the central support legs 76 in the housing cup 14. Subsequently, the housing cover 16 is placed axially relative to the filter axis 38 onto the housing cup 14. In this connection, the receiving section 52 engages the rim 36 of the housing cup 14. The seal 78 is compressed by means of the sealing section 46 with the housing sealing surface 50 in axial direction. In this context, the corner support legs 72 and 74 and the central support legs 76 act as counter bearings. Because of the axial compression, the seal 78 is deformed in radial outward direction so that it is also resting seal-tightly on the radial sealing surface 40. In this way, the seal 78 realizes an axial sealing action as well as a radial sealing action. The seal 68 forms a sealing device for sealing the clean side 58 relative to the raw side 62. The housing cover 16 is secured on the housing cup 14 in a way that is not of interest in this context.

Figure 3:
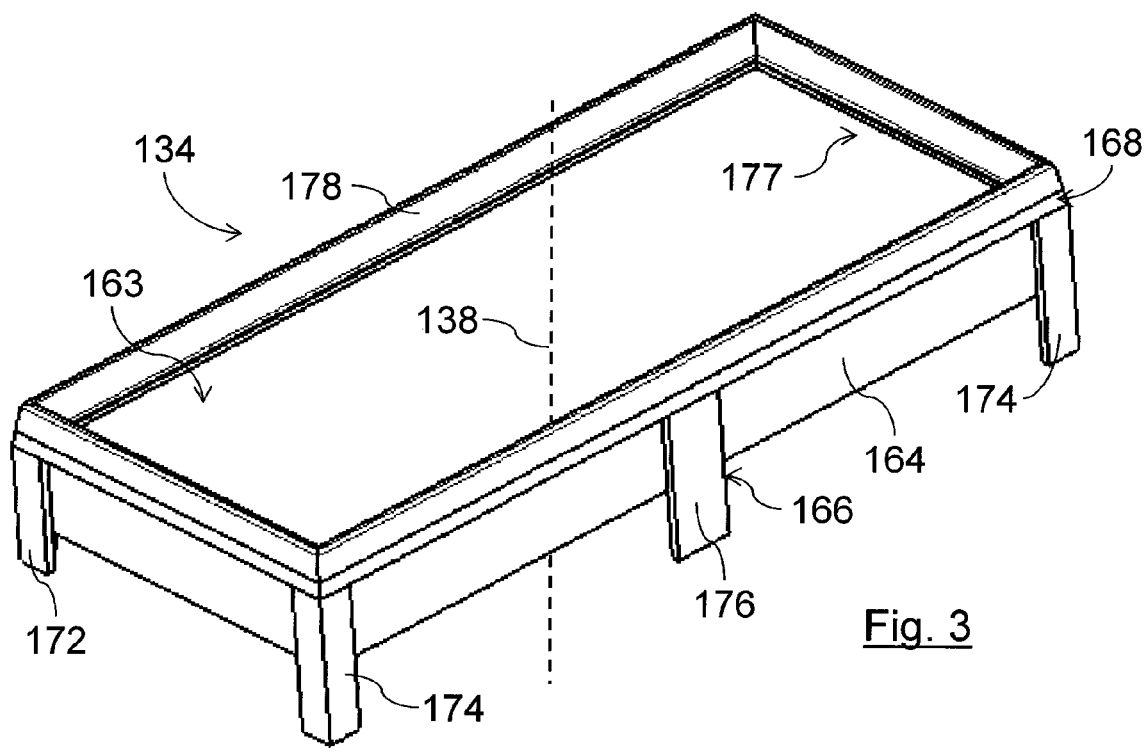
FIG. 3 an isometric illustration of a flat filter element according to a second embodiment which is similar to the flat filter element of FIGS. 1 and 2.
Figure 4:
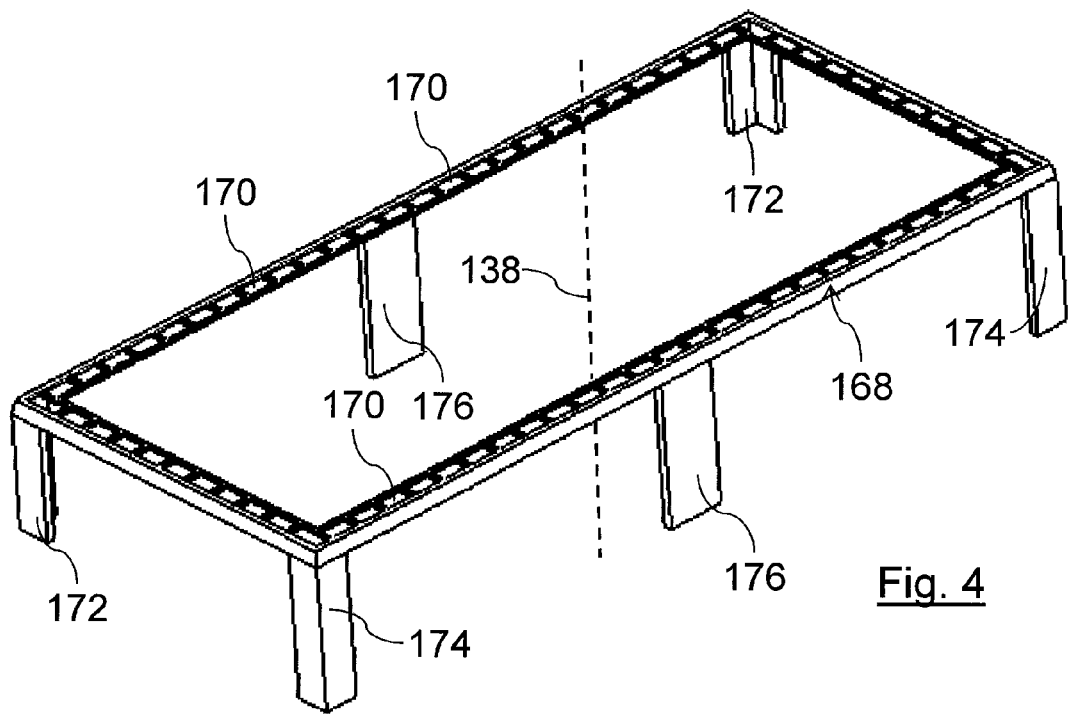
FIG. 4 an isometric illustration of a support device of the flat filter element of FIG. 3.
Figure 5:
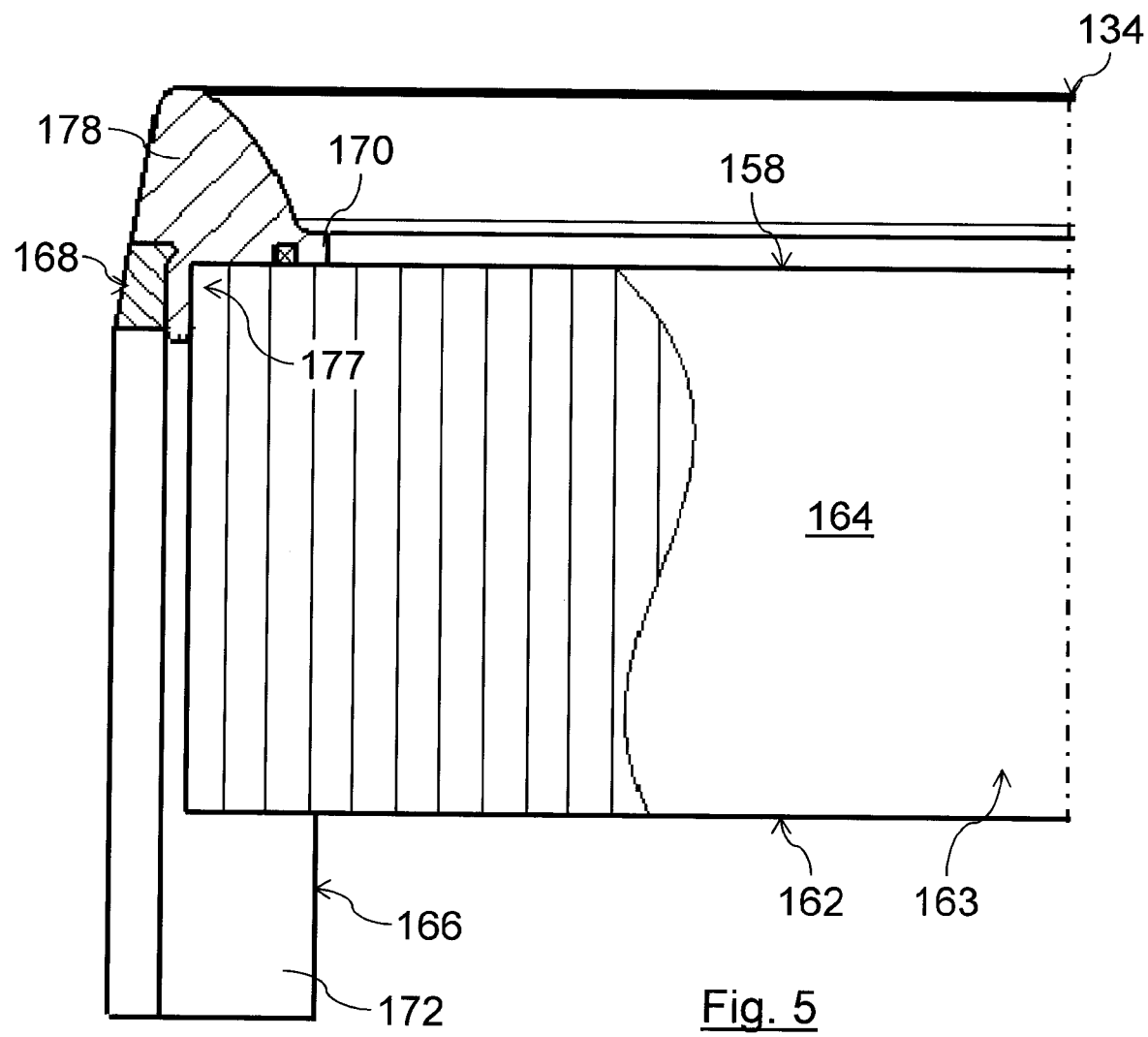
FIG. 5 a detail section view of the flat filter element of FIG. 3.

In FIGS. 3 to 5 a second embodiment of the flat filter element 134 is illustrated. Those elements that are similar to those of the first embodiment of FIGS. 1 and 2 are identified with the same reference characters with 100 being added. The second embodiment differs from the first embodiment in that in the second embodiment the support device 166 is provided additionally with a support frame 168. The support frame 168 is arranged on the side of the filter bellows 163 which is facing the housing cover 116. It projects past the filter bellows 163 in radial direction outwardly. The support frame 168 overlaps the filter bellows 163 on its clean side 158 in radial direction. In the support frame 168 a plurality of through openings 170 is distributed circumferentially. On the corners of the support frame 168 one of the support legs 172 and 174 is arranged, respectively. In contrast to the first embodiment of FIGS. 1 and 2, the two central support legs 176 have different axial lengths. The short central support leg 176 is located between the two short corner support legs 172. The long central support leg 176 is located between the two long corner support legs 174. The corner support legs 172 and 174 and the central support legs 176 terminate flush with the support frame 168 and are connected monolithically therewith. The corner support legs 172 and 174 and the central support legs 176 extend away from the support frame 168 in axial direction. By means of the support frame 168 the force introduction of the corner support legs 172 and 174 and of the central support legs 176 is uniformly distributed circumferentially onto the seal 178.

When producing the flat filter element 134, the folded filter medium 174 is arranged in the support device 166 such that the clean side 158 of the filter bellows 63 is resting on the support frame 168. Subsequently, the seal 168 is realized by foaming or injection molding PUR foam onto the support frame 168. When doing so, the PUR foam flows through the openings 170 and bonds within the element sealing section 177 with the filter medium 164, as shown in FIG. 5. The support frame 168 is thus embedded partially into the seal 168.

Figure 6:
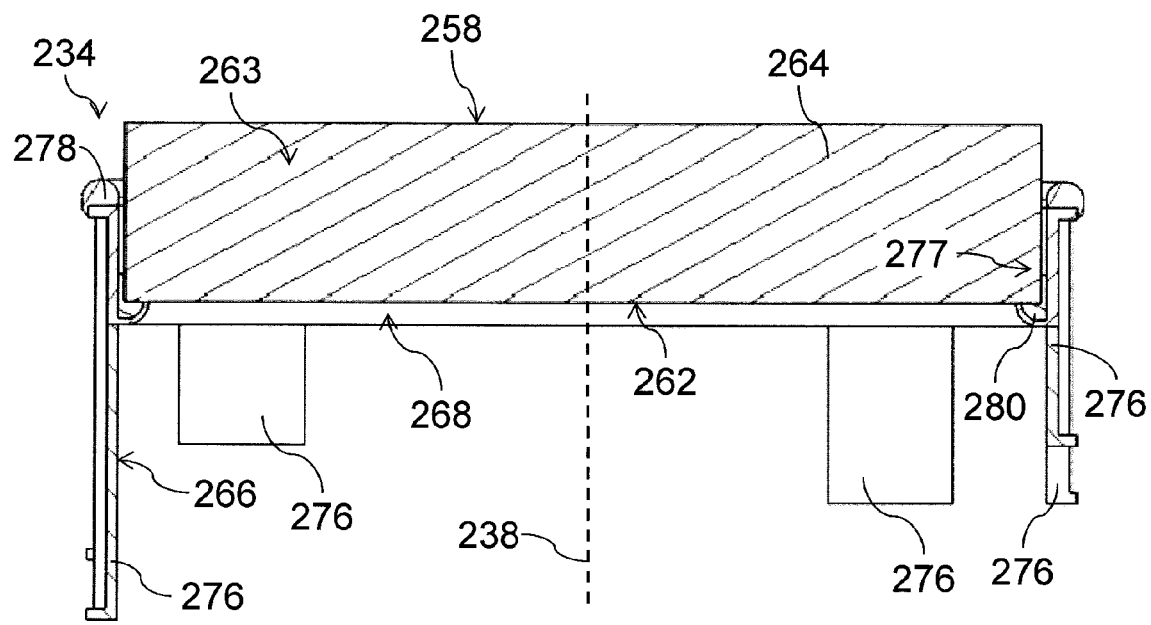
FIG. 6 a longitudinal section of a flat filter element according to a third embodiment which is similar to the flat filter elements of FIGS. 1 through 5.

In FIG. 6, a third embodiment of a flat filter element 234 is illustrated. Those elements that are similar to those of the second embodiment of FIGS. 3 to 5 are provided with the same reference characters, with 100 being added. The third embodiment differs from the second embodiment in that corner support legs at the axial edges of the filter bellows 263 and the corners of the support frame 268 are eliminated. Instead, on each side of the filter bellows 263 extending in axial direction, two central support legs 276 are arranged. In contrast to the second embodiment of FIGS. 3 to 5, the support frame 268 in the third embodiment is not arranged on the ends of the central support leg 276 but in an area between the ends of the central support legs 276. The central support legs 276 project thus past the support frame 268 on both sides in axial direction. The support frame 268 is located on the raw side 262 of the filter bellows 263. On the side facing the filter bellows 263 the support frame 268 is of a groove-shaped configuration. In the groove a circumferentially closed medium seal 280 is arranged. The medium seal 280 seals an element sealing section 277 of the filter bellows 263 relative to the support frame 268. The ends of the central support legs 276 on the clean side 258 are embedded in the seal 278. The seal 278 is located, viewed axially relative to the filter axis 238, at the level of a central area of the radial outer circumferential sides of the filter bellows 263. The seal 278 and the medium seal 280 form together a sealing device for sealing the clean side 258 relative to the raw side 262.

Figure 7:
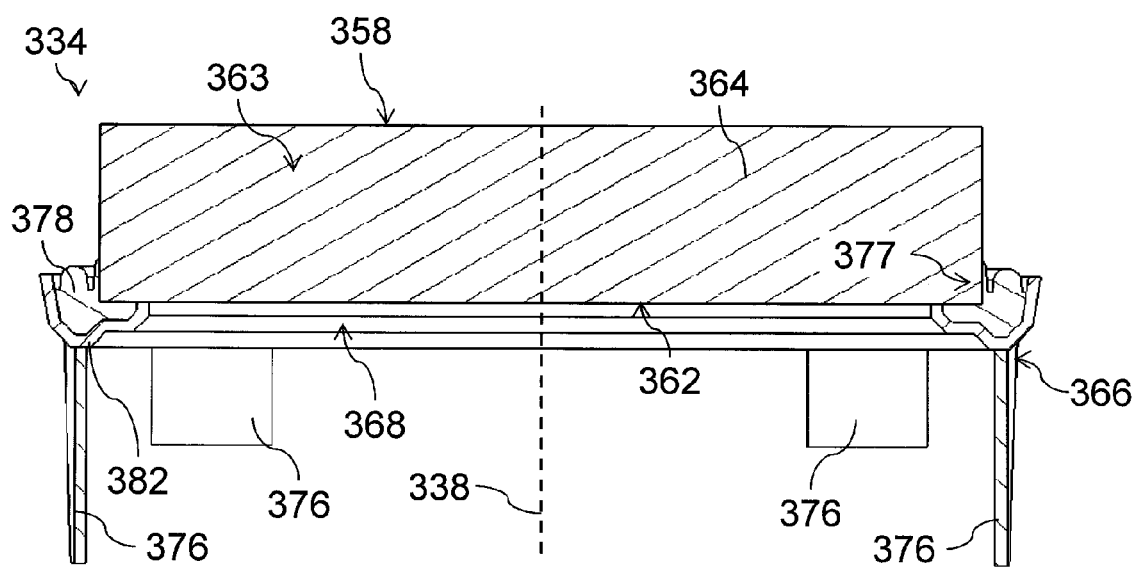
FIG. 7 a longitudinal section of a flat filter element according to a fourth embodiment which is similar to the flat filter elements of FIGS. 1 to 6.

In FIG. 7, a fourth embodiment of a flat filter element is illustrated. Those elements that are similar to those of the second embodiment of FIGS. 3 to 5 are provided with the same character, with 200 being added. The fourth embodiment differs from the second embodiment in that the filter bellows 363 is arranged on the side of the support frame 368 which is opposite the central support legs 376. In the fourth embodiment of FIG. 7, as in the third embodiment of FIG. 6, corner support legs are not provided. Instead, on each side of the filter bellows 363 extending in the axial direction, two central support legs 376 are arranged, respectively. The support frame 363 has a groove 382 which is open toward the filter bellows 363. The seal 378 is located in the groove 382. The central support legs 376 have different axial lengths and can thereby compensate corresponding steps of the bottom of the housing cup. The support frame 368 overlaps the filter bellows 363 radially inwardly so that the filter bellows 363 with its raw side 362 is resting on the support frame 368 and a radial inner section of the seal 378. When the flat filter element 334 is mounted, the filter bellows 363 is located within the housing cover.

In all of the above described embodiments of an air filter 10 and of a flat filter element 34; 134; 234; 334 inter alia the following modifications are possible.

The invention is not limited to air filters 10 of internal combustion engines of motor vehicles. Instead, it can also be used outside of automotive technology, for example, in industrial motors. The invention is also not limited to filters for air. For example, it can be used also for filters for different fluids, for example, oil, fuel, or water. It can also be used independent of internal combustion engines, for example, in an air supply device of a passenger compartment of a motor vehicle, for example, of an air conditioning device.

The radial sealing surfaces 40 on the housing cup 14 can also be eliminated.

The filter medium 64; 164; 264; 364 instead of being folded in a zigzag shape can also be flat. Instead of a nonwoven, a different kind of filter medium, for example, a type of foam material, can be used also.

The filter bellows 63; 163; 263; 363 instead of being flat can also be bent. Instead of being parallelepipedal, it can also be shaped differently. For example, it can have the shape of a different type of polyhedron or a different type of body that is delimited by at least one curved surface.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A flat filter element of a fluid filter having a central axis, comprising:
a filter medium (64; 164; 264; 364) with an inflow-side raw side (62; 162; 262; 362's) at a first axial side of the filter element and an outflow-side clean side (58; 158; 258; 358) at an opposing axial side of the filter element;

wherein the filter element is a flat filter element and not a round filter element, the filter medium of the flat filter element having plurality of lateral side faces forming a parallelpipedal filter element, each lateral side face extending axially from the inflow-side to the outflow-side; and an element sealing section (77; 177, 277; 377) arranged on the lateral side faces of the filter medium and circumferentially surrounding the filter medium, the element sealing section arranged at one of the: the raw side (62; 162; 262; 362), the clean side (58; 158; 258; 358) or arranged between the raw side (62; 162; 262; 362) and the clean side (58; 158; 258; 358);

a sealing device (78; 178; 278; 280; 378) arranged on and supported on the element sealing section (77; 177, 277; 377);

wherein the sealing device (78; 178; 278; 280; 378) is arranged on the filter medium and forms a seal between the filter element and a filter housing (12) into which the filter element is installed, the sealing device sealing the raw side (62; 162; 262; 362) relative to the clean side (58; 158; 258; 358);

at least one support/positioning body (72, 74, 76; 172, 174, 176; 276; 376) resting directly on the lateral side faces the filter medium and supported on an interior of the filter housing, the at least one support/positioning body (72, 74, 76; 172, 174, 176; 276; 376) positioning and securing the sealing device (78; 178; 280; 378) in the filter housing (12), on the one hand on the sealing device (78; 178; 280; 378) and on the other hand on the filter housing (12);

wherein the at least one support/positioning body includes
at least one L-shaped corner support leg having two angled leg portions forming an L-shaped support leg profile, the at least one corner support leg arranged on a corner of the filter medium formed where an adjacent two of the lateral side faces of the filter medium meet;

wherein each of the two angled leg portions of at least one L-shaped support leg are arranged directly on a different one of the lateral side faces forming the corner;

wherein the at least one L-shaped corner support leg has an first axial end projecting axially outwardly beyond the filter element at a nearest one of the inflow-side or outflow-side;

wherein an opposing second axial end of the at least one L-shaped support leg is embedded into the sealing device, securing the at least one L-shaped support leg to the filter medium.

2. The flat filter element according to claim 1, wherein the at least one support/positioning body (72, 74, 76; 172, 174, 176; 276; 376) extends axially parallel to a central axis (38; 138; 238; 338) of the filter (10).

3. The flat filter element according to claim 2, wherein the at least one support/positioning body (72, 74, 76; 172, 174, 176; 276; 376) projects axially outwardly beyond the filter medium (64; 164; 264; 364) at least on one of the sides of the filter medium, when viewed axially relative to the central axis (38; 138; 238; 338) of the filter (10).

4. The flat filter element according to claim 2, wherein the at least two support/positioning bodies (72, 74, 76; 172, 174, 176; 276; 376) are provided that, viewed axially relative to a central axis (38; 138; 238; 338) of the filter (10), have different lengths.

5. The flat filter element according to claim 2, further comprising:
a circumferentially extending support frame (168; 268; 368) is provided on which the sealing device (78; 178; 278, 280; 378) is arranged and supported thereon;

wherein the at least one support/positioning body (172, 174, 176; 276; 376) supports the circumferentially extending support frame (168; 268; 368).

6. The flat filter element according to claim 2, further comprising:
the flat filter element (34; 134; 234; 334) is exchangeably arranged within the filter housing (12);
wherein the filter housing (12) is a two-part configuration, the two parts separable to provide access to the flat filter element (34; 134; 234; 334) for replacement.

7. A filter (10) for fluids having a central axis, comprising:
a flat filter element (34; 134; 234; 334) including
a filter medium (64; 164; 264; 364) with an inflow-side raw side (62; 162; 262; 362's)) at a first axial side of the filter element and an outflow-side clean side (58; 158; 258; 358) at an opposing axial side of the filter element;

wherein the filter element is a flat filter element and not a round filter element, the filter medium of the flat filter element having plurality of lateral side faces forming a parallelpipedal filter element, each lateral side face extending axially from the inflow-side to the outflow-side, the lateral side faces; and an element sealing section (77; 177, 277; 377) arranged on the lateral side faces of the filter medium and circumferentially surrounding the filter medium, the element sealing section arranged at one of the: the raw side (62; 162; 262; 362), the clean side (58; 158; 258; 358) or arranged between the raw side (62; 162; 262; 362) and the clean side (58; 158; 258; 358);

a sealing device (78; 178; 278; 280; 378) arranged on and supported on the element sealing section (77; 177, 277; 377);

a filter housing in which the flat filter element (34; 134; 234; 334) is replaceably arranged;

wherein the sealing device (78; 178; 278; 280; 378) is arranged on the filter medium and forms a seal between the filter element and the filter housing (12) sealing the raw side (62; 162; 262; 362) relative to the clean side (58; 158; 258; 358);

at least one support/positioning body (72, 74, 76; 172, 174, 176; 276; 376) supported on an interior of the filter housing, the at least one support/positioning body (72, 74, 76; 172, 174, 176; 276; 376) positioning and securing the sealing device (78; 178; 280; 378) within the filter housing (12), on the one hand on the sealing device (78; 178; 280; 378) and on the other hand on the filter housing (12);

wherein the at least one support/positioning body includes
at least one L-shaped corner support leg having two angled leg portions forming an L-shaped support leg profile, the at least one corner support leg arranged on a corner of the filter medium formed where an adjacent two of the lateral side faces of the filter medium meet;

wherein each of the two angled leg portions of at least one L-shaped support leg are arranged directly on a different one of the lateral side faces forming the corner;

wherein the at least one L-shaped corner support leg has an first axial end projecting axially outwardly beyond the filter element at a nearest one of the inflow-side or outflow-side and resting on an interior of the housing;

wherein an opposing second axial end of the at least one L-shaped support leg is embedded into the sealing device, securing the at least one L-shaped support leg to the filter medium.

8. A support device (66; 166; 266; 366) of a filter according to claim 7, the support device configured to be received on the lateral side faces of the flat filter element (34; 134; 234; 334) of the filter (10) to circumferentially surround the filter;

the support device positioning and securing the sealing device (78; 178; 278; 280; 378) in the filter housing (12).

* * * * *